US011841769B2

(12) United States Patent
Minarik et al.

(10) Patent No.: US 11,841,769 B2
(45) Date of Patent: Dec. 12, 2023

(54) LEVERAGING ASSET METADATA FOR POLICY ASSIGNMENT

(71) Applicant: EMC IP Holding Company LLC, Hopkinton, MA (US)

(72) Inventors: Jennifer M. Minarik, Zionsville, IN (US); Mark Malamut, Aliso Viejo, CA (US); Brian E. Freeman, Golden, CO (US)

(73) Assignee: EMC IP Holding Company LLC, Hopkinton, MA (US)

( * ) Notice: Subject to any disclaimer, the term of this patent is extended or adjusted under 35 U.S.C. 154(b) by 155 days.

(21) Appl. No.: 17/400,480

(22) Filed: Aug. 12, 2021

(65) Prior Publication Data

US 2023/0053273 A1 Feb. 16, 2023

(51) Int. Cl.
*G06F 16/00* (2019.01)
*G06F 11/14* (2006.01)
*G06F 16/28* (2019.01)

(52) U.S. Cl.
CPC ........ *G06F 11/1461* (2013.01); *G06F 16/285* (2019.01); *G06F 2201/84* (2013.01)

(58) Field of Classification Search
CPC . G06F 11/1461; G06F 16/285; G06F 2201/84
USPC ........................................................ 707/654
See application file for complete search history.

(56) References Cited

U.S. PATENT DOCUMENTS

| 9,323,789 | B1 * | 4/2016 | Elliott, IV | G06F 11/1458 |
| 9,336,302 | B1 * | 5/2016 | Swamy | G06F 16/2465 |
| 9,645,851 | B1 * | 5/2017 | Elliott, IV | G06F 9/50 |
| 9,665,628 | B1 * | 5/2017 | Dubey | G06F 16/2379 |
| 2013/0124525 | A1 * | 5/2013 | Anderson | G06F 16/278 |
| | | | | 707/737 |
| 2018/0089301 | A1 * | 3/2018 | Kafai | G06F 16/285 |
| 2019/0370495 | A1 * | 12/2019 | Chen | G06F 21/6254 |
| 2019/0394238 | A1 * | 12/2019 | Putz | G06N 3/08 |
| 2020/0265042 | A1 * | 8/2020 | Beller | G06F 16/93 |

FOREIGN PATENT DOCUMENTS

CN     102414677 A  *  4/2012   ....... G06F 17/30082

* cited by examiner

*Primary Examiner* — Monica M Pyo
(74) *Attorney, Agent, or Firm* — Staniford Tomita LLP (57) ABSTRACT

Embodiments for a data protection method of grouping assets for protection policy assignment based on asset metadata by defining a set of metrics characterizing each asset in the system and comparing each metric of an asset with corresponding metrics of other asset groups each containing one or more other assets. A unique protection policy is assigned to each group for application to each asset within a respective group. An overall affinity percentage of the metrics of asset with the corresponding metrics of each group is determined, and the asset is automatically grouped into the group based with the highest overall affinity percentage. The user is prompted to confirm the automatic grouping or to select a different group for assigning to the asset.

14 Claims, 9 Drawing Sheets

| METRIC | DETAILS |
|---|---|
| Geolocation | Where Asset is Physically Located |
| Network Info | IP address, LAN, Subnet |
| OS Version | Operating System and Version |
| Asset Type | DB, VM, File System, Data Center, etc. |
| Data Size | Capacity of the Asset |
| System Name | Naming Convention of the Asset |
| Applications | Types of Applications Running on the System |

DISCOVERY JOB

702

USER A  You have 2 new assets discovered

Automatic Assignment

Asset A has been assigned to Production VMs Policy group
Discovered on 4/30/2021 has 98% match

704

Confirmation Required

Asset B discovered on 04/30/2020 has not been automatically assigned.
Select the correct policy from below View Details  708

- Lab SQL Systems  62% match  -  Confirm Assignment

- Production VMs  52% match  -  Confirm Assignment

- End User Backups  4% match  -  Confirm Assignment

LEVERAGING ASSET METADATA FOR POLICY ASSIGNMENT

TECHNICAL FIELD

This invention relates generally to data backup systems, and more specifically to using asset metadata for automatic assignment of protection policies to new data assets.

BACKGROUND

Backup software is used by large organizations to store their data for recovery after system failures, routine maintenance, archiving, and so on. Backup sets are typically taken on a regular basis, such as hourly, daily, weekly, and so on, and can comprise vast amounts of information. Backup programs are often provided by vendors that provide backup infrastructure (software and/or hardware) to customers under service level agreements (SLA) that set out certain service level objectives (SLO) that dictate minimum standards for important operational criteria such as uptime and response time, etc. Within a large organization, dedicated IT personnel or departments are typically used to administer the backup operations and apply appropriate backup policies to specific data assets.

Backing up important data and infrastructure is critical to a company's ongoing operations. However, such data typically comprises very large amounts of information featuring different characteristics, such as data type, data source, storage requirements, and so on. Accordingly enterprise data is often treated and classified as different types of assets so that specific protection policies can be applied to each data type to ensure that backup and restore operations can deliver appropriate service level requirements. Such differential policy assignments are also crucial in helping companies manage costs as data storage and backup/restore operations can be expensive. In present data storage environments, this is typically accomplished by manually assigning specific assets to a policy (manual assignment), or constructing policy assignment rules to add automatically assets to policies if they meet some user-defined criteria (rule-based assignment).

Both of these present methods pose several issues, however. The primary issues with manual assignment are that it is time consuming and newly added assets do not receive immediate protection, which leaves new assets at risk. To protect these new assets backup administrators must take the time to go back into their management consoles and manually add these new assets to their existing backup policies. This often creates a significant time lag between asset creation and first backup, which can put company data at risk. The rule-based policy approach was developed to address the backup time-lag issue; however. This approach, however, still has a major issue in that creation of these rules by an administrator can be time consuming and may result in rules that are too simplistic and prone to errors.

What is needed, therefore, is a data asset protection system that leverages asset metadata to identify common characteristics of assets and use that data to automatically provide new asset policy assignments. Such an approach would save administrators the time and effort needed to both assign and naturally group their assets into the appropriate policies.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the certain methods and processes described herein. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope of the embodiments.

Some embodiments involve data processing in a distributed system, such as a cloud based network system or very large-scale wide area network (WAN), and metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a data asset protection system that leverages asset metadata to identify common characteristics of assets and use that data to guide new asset policy assignments. This process saves the time and effort needed to both assign and naturally group their assets into the appropriate policies by providing a much richer dataset than the present rules-based approach with the benefit of requiring no additional effort on the part of a system administrator. Additionally, a guided metadata policy assignment allows asset categorizations to naturally and dynamically change with the users' environment, thus facilitating optimal application of backup policies to appropriate data assets to continuously meet service level agreements (SLAs), and other defined performance requirements.

Figure 1:
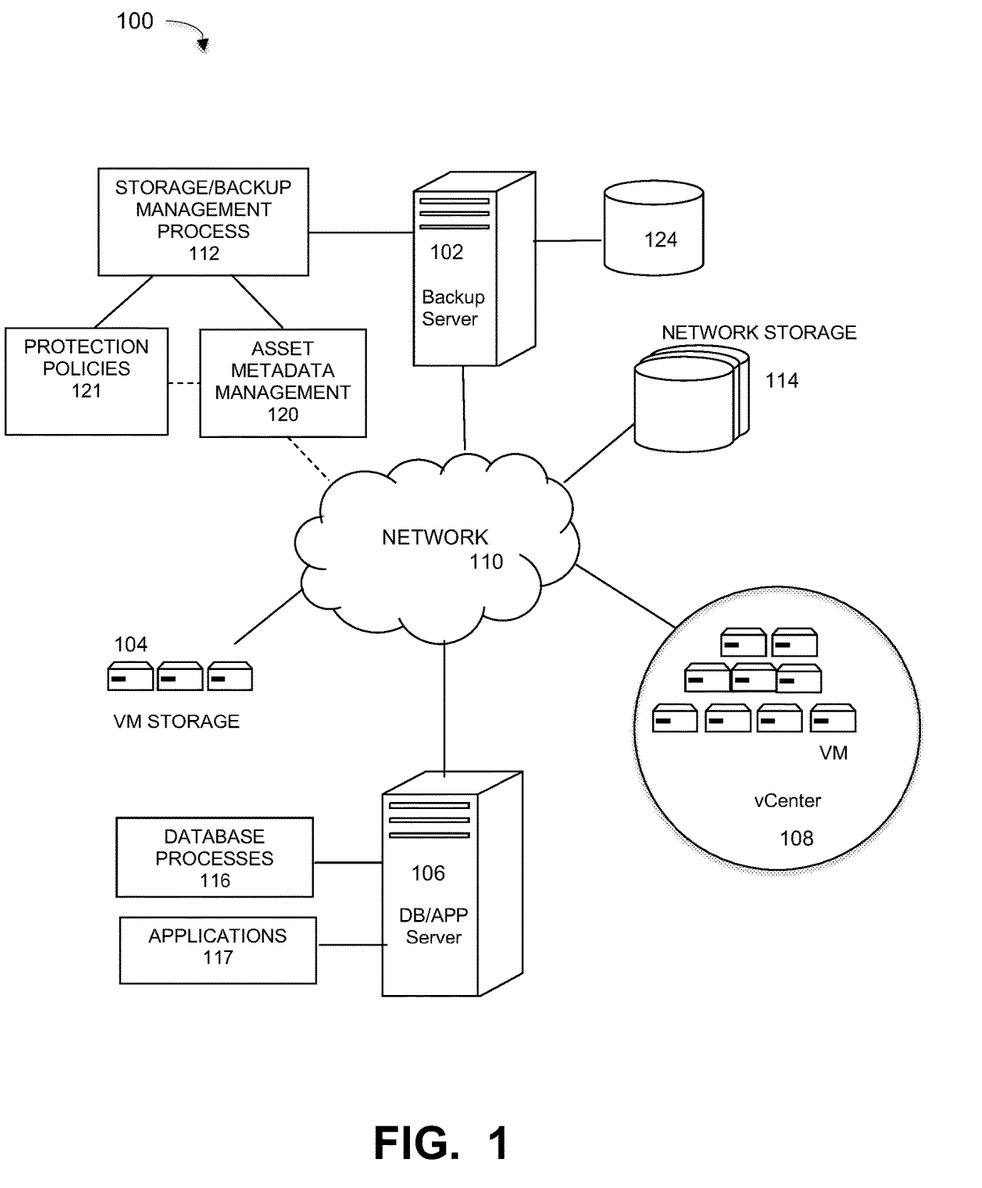
FIG. 1 is a diagram of a network implementing a data protection policy assignment process using asset metadata, under some embodiments.

FIG. 1 illustrates a computer network system that implements one or more embodiments of a network data backup system implementing an asset metadata and backup policy assignment process, under some embodiments. In system 100, a backup server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs may be provided to serve as backup targets. FIG. 1 illustrates a virtualized data center (vCenter) 108 that includes any number of VMs for target storage. The VMs or other network storage devices serve as target storage devices for data backed up from one or more data sources, such as a database or application server 106, or the data center 108 itself, or any other data source, in the network environment. The database server can be a single machine or a cluster. The data sourced by the data source may be any appropriate data, such as database 116 data that is part of a database management system or any appropriate application 117. Such data sources may also be referred to as data assets and represent sources of data that are backed up using process 112 and backup server 102.

The network server computers are coupled directly or indirectly to the network storage 114, target VMs 104, data center 108, and the data sources 106 and other resources through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may comprise at least part of a Data Domain Restorer (DDR)-based deduplication storage system, and storage server 102 may be implemented as a DDR Deduplication Storage server provided by EMC Corporation. However, other similar backup and storage systems are also possible.

Backup software vendors typically provide service under a service level agreement (SLA) that establishes the terms and costs to use the network and transmit/store data specifies minimum resource allocations (e.g., storage space) and performance requirements (e.g., network bandwidth) provided by the provider. The backup software may be any suitable backup program such as EMC Data Domain, Avamar, and so on. In cloud networks, it may be provided by a cloud service provider server (e.g., Amazon, EMC, Apple, Cisco, etc.).

In most large-scale enterprises or entities that process large amounts of data, different types of data are routinely generated and must be backed up for data recovery purposes.

To optimize storage costs and data availability, such backup processes are often dictated by several different data protection (backup) policies 121 applied to different types or classes of data. These policies define important parameters such as backup periods (e.g., daily, weekly, monthly, etc.), storage targets (e.g., local fast storage, network hard drive, cloud archive, etc.), retention times (e.g., 2/5/10 years, etc.), transfer priority, user access, and other similar parameters.

For the embodiment of FIG. 1, the asset metadata management process 120 provides a dynamic and efficient method of optimally assigning policies to assets by analyzing asset metadata to identify common characteristics of assets and to use that data to assign or re-assign protection policies to new assets. The process 120 performs three main sub-tasks comprising (1) extracting asset metadata from new assets, (2) using the extracted metadata to identify optimal policy assignments for those assets based on existing policy clusters, and (3) prompting the user to confirm the defined policy assignments.

For the embodiment of FIG. 1, the asset metadata management process 120 may be implemented as a component that runs within a data protection infrastructure, and can be run as an independent application or embedded into an instance of data protection software 112 or a data protection appliance. Process 120 may provide input directly to the backup process 112 to identify and select policies 121 that are also accessed or provided within the backup software 112. Alternatively, it may act directly on the protection policies 121 to dictate which policies are applied by the backup software for the respective assets. Any of those implementations may also be on-premise implementations on client machines within a user's data center or running as a hosted service within the cloud (e.g., network 110).

Figure 2:
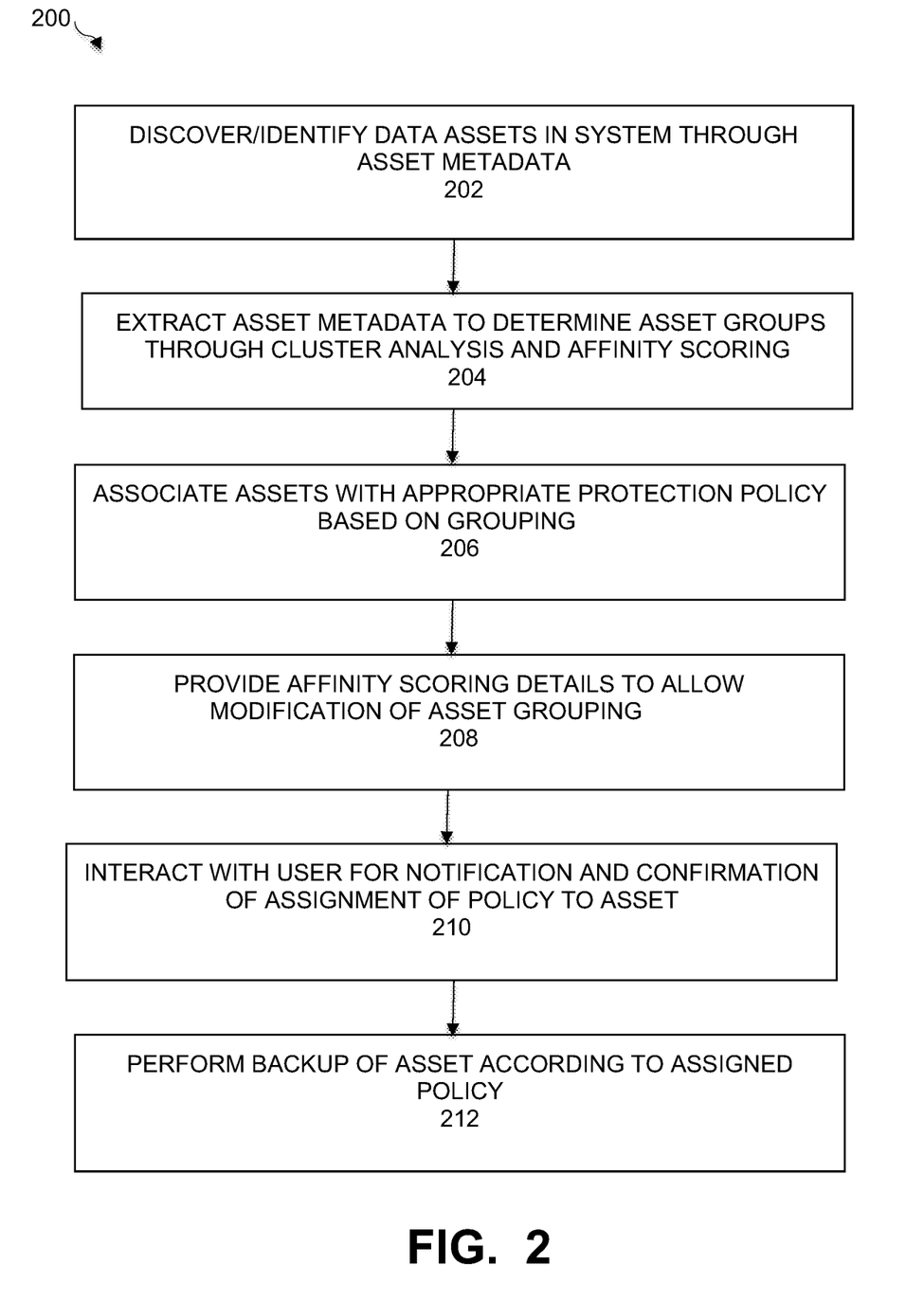
FIG. 2 is a flowchart illustrating a method of optimally assigning data protection policies based on asset metadata, under some embodiments.

FIG. 2 is a flowchart illustrating a method of optimally assigning data protection policies based on asset metadata, under some embodiments. As shown in FIG. 2, process 200 first discovers and/or identifies data assets in the system, 202. The data assets comprise any dataset or source of data that a user wants to backup for data protection (i.e., data backup, storage and/or recovery/restoration) purposes. Such assets can be individual files, file directories, file systems, databases, database servers, data processing applications, Virtual Machines (VMs), and so on. Such assets may be defined by their source or by the applications that process the data, as well as other characteristics, such as storage or data type, priority (criticality), protection requirements, user access, and other relevant parameters. The asset discovery step 202 may be performed using any appropriate data or network analysis process that identifies assets in a network based on certain defined keywords or identifiable phrases in a name, identifier, or similar data field. For example, a standard network discovery job that is run on a periodic basis can be used to identify current assets as well as new assets added after a previous discovery operation.

The software code of each asset contains certain metadata elements or data fields that identify and define the asset. Because enterprise data inherently comes from many disparate sources, data field and naming conventions can vary widely across all the different data assets. A parser may be used to identify relevant terms that help identify data assets, as well as the asset characteristics. For example, terms such as "Production" or "prod," "Test," "database" or "db," "Oracle," "SQL," and so on, indicate data elements that the parser would recognize as being data assets to be protected by certain protection policies. Such characteristics are typically embodied as metadata of the asset, as opposed to the actual data itself. In an embodiment, process 200 extracts the asset metadata using recognizable terms identifying a data asset and its relevant characteristics, 204. metadata associated with or defined as part of an asset is examined to identify relevant assets for process 200.

Figure 3:
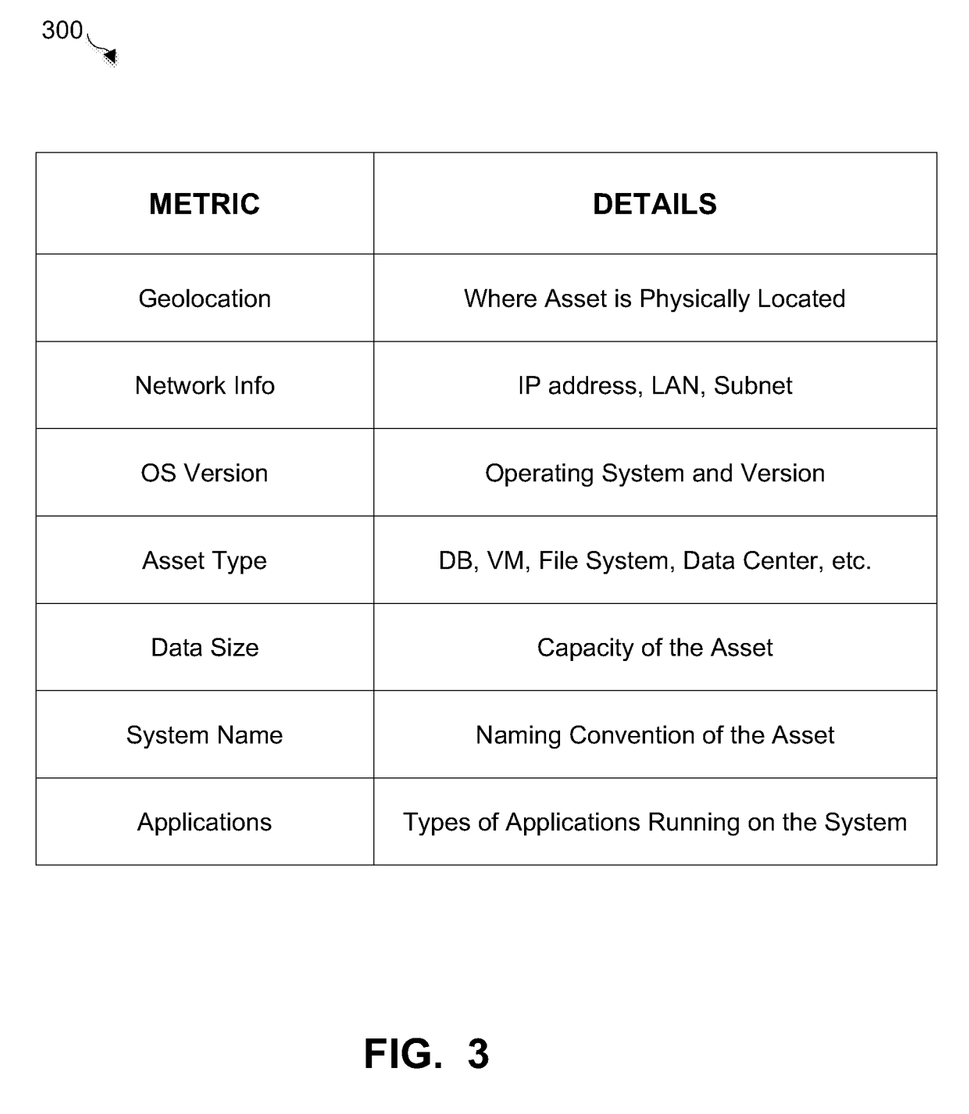
FIG. 3 is a table that lists example metrics of an asset, under an example embodiment.

Each asset thus has a set of characteristics or attributes that defines certain features of each asset, and which are referred to as 'metrics' of an asset. FIG. 3 is a table 300 that lists example metrics of an asset, under an example embodiment. The example of FIG. 3 illustrates certain metrics, such as geolocation, network information, operating system, asset type, data size, system name, and applications. FIG. 3 is intended to provide an example of some possible asset metrics, and many others are also possible. For example, in a virtualized system, the metrics could include: cluster name, datacenter/datastore name, host name, OS, vCenter name, VM name, VM folder name, VM resource pool, VM size, VM tags, and so on.

These metrics provide a rich dataset of characteristics for both newly discovered assets and those already known within the system, and are leveraged by the system to facilitate the optimal matching of policies to the assets. Any number of metrics may be provided for the assets depending on the system and configurable parameters. In general, the greater the number of metrics, the more informed can be the policy matching process.

Since the system may contain a great many assets, with only a relatively fewer number of policies to apply to these assets, the assets are generally clustered together into different groups, each having certain common characteristics and for which the same protection policy is applied. Thus, as shown in step 204, the extracted metadata (metric information) is used to determine which group a particular cluster should be assigned.

When a discovery job is performed for the first time for a network, the system would take all assets discovered the first time, compute clusters for each assets and assign them to a default policy, or use simple rules for day one and use a set of default policies.

In process 200, once a new asset's metadata is obtained, a cluster analysis process is performed to compare the new asset to assets already assigned to specific backup policies. The strength of these comparisons is used to determine which group, or groups, the new asset is most strongly associated with based on their relative affinity scores.

Each asset (existing and new) has a position in n-dimensional space. Standard clustering determines clusters by computing a boundary around a subset of assets. This is controlled by certain clustering parameters. Each cluster has a centroid and the distance from each new asset to each cluster's centroid can be computed. In an embodiment, a standard cluster analysis technique is used to perform the asset grouping, 204. This group assignment then determines the protection policy that is applied to the asset, 206, through an affinity scoring process that is computed by normalizing the distance. In general, an affinity score represents a percentage closeness of the asset metrics to a centroid of a cluster having other assets. Such a score may be expressed as a percentage number, such that an asset may be X % close to one cluster and Y % close to another cluster, and the greater of X or Y determines to which cluster the asset should be grouped. For purposes of description, the terms "affinity score" and "affinity percentage" are used interchangeably.

Figure 4:
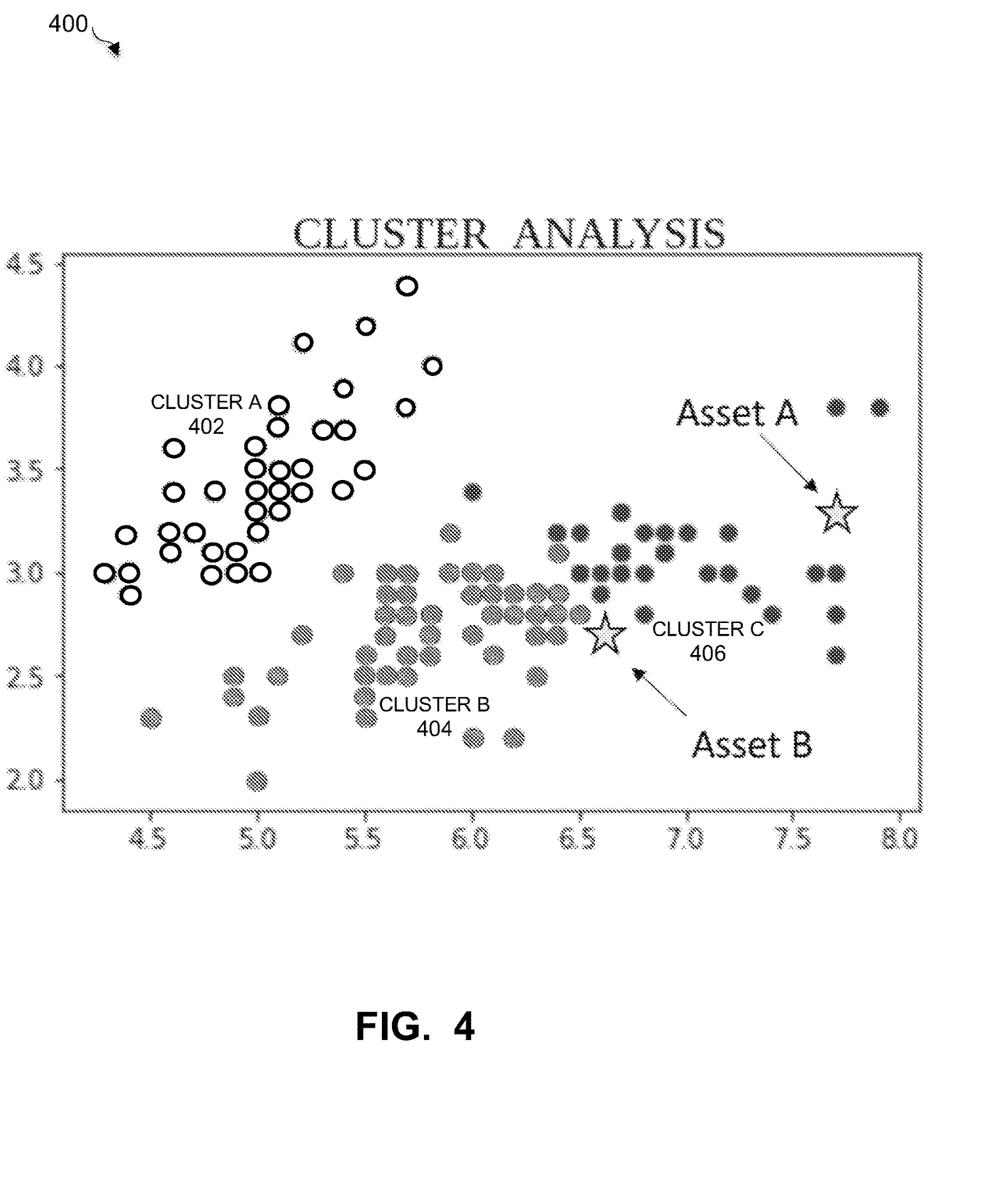
FIG. 4 illustrates an example of a clustering process for new assets, under some embodiments.

FIG. 4 illustrates an example of a clustering process for new assets, under some embodiments. As shown in FIG. 4, a cluster analysis plot 400 shows an example of three distinct clusters 402, 404, and 406 for individual assets plotted over given X and Y dimensions. These dimensions may be rankings along any appropriate metric or grouping of metrics. Additionally, the cluster analysis may be represented in any number (more than 2) dimensions. The grouping of the assets in a defined cluster dictates the policy applied to all of the assets in that cluster. Thus, for example, cluster A (402) may have an end user backup policy applied to it, while cluster B (404) may have Lab SQL system policies applied, while cluster C (406) may have production VM policies applied.

For the example of FIG. 4, there are two newly discovered assets (Asset A and Asset B). Through process 200, the metadata for each of these assets is extracted and then plotted along with that of all the other assets. Once the new assets are plotted, the system will compute an affinity score between each new asset and each cluster. These scores provide information that highlights similarities to existing policies and allows the new policies to be optimally assigned to specific policies, thus simplifying policy assignment.

In an embodiment, any practical combination of parameters may be used to calculate the affinity scores for assets in relation to existing clusters (or other assets) for the cluster analysis process. In an embodiment, affinity scores are calculated by evaluating a distance to the centroid of each cluster. Each metric (or attribute or feature) for each asset is used to plot assets. Cluster analysis looks at the grouping (or clustering) and automatically determines a boundary for each cluster. A centroid for each cluster is then computed, and then the distance to this centroid for each new asset can be computed. This cluster centroid distance is thus used to compute the affinity score. In an embodiment, an affinity score can be computed as follows: first, the distance from an asset to the centroid of each cluster is computed; second, the furthest distance is normalized to 1, and all others are a percentage of that distance; third, the affinity score is calculated as 1 minus the normalized distance.

For this calculation, any number (N) metrics may be used to calculate the overall affinity score. This can comprise all or any relevant subset of the metrics for assets in the system, such as shown in Table 300. In general, some metrics may be more important than others with regard to assignment of data protection policies. In an embodiment, appropriate weighting factors can be applied to each metric for the overall affinity score calculation.

The overall affinity percentage value (or score) for each asset is then used to place the asset in the plot of asset groups, as shown in FIG. 4. For the example of FIG. 4, it can be seen that Asset A is very strongly associated and can be automatically assigned with cluster C, which would be the Production VM's policy. Also in this example, it can be seen that Asset B has characteristics that are very closely associated with both cluster C (Production VMs) as well as cluster B (Lab SQL Systems). This illustrates a case in which an asset does not clearly fall into a single policy grouping, but rather two or more other clusters. In this case, the user is given the option to assign the asset to one of these policies. To aid this decision the user is given the overall affinity score for each policy group, as well as a detailed list of information comparing the value of the asset to the group averages (when possible) across the set of metrics/features used to generate the cluster analysis. Thus, as shown in FIG. 2, step 208 of process 200 provides affinity scoring details to allow modification of asset grouping, if necessary.

Figure 5:
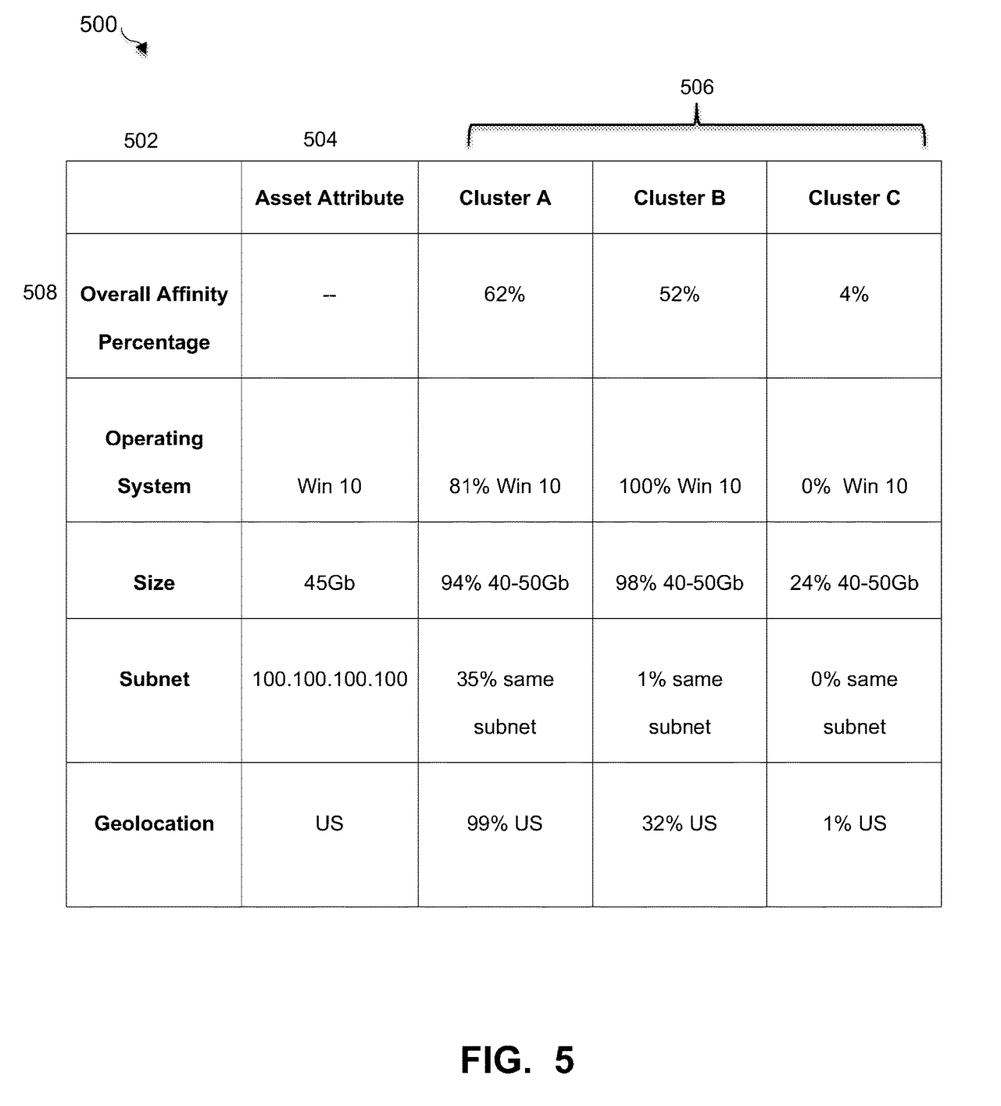
FIG. 5 is a table illustrating an example overall affinity percentage calculation for different clusters based on some individual metric affinity percentages, under an example embodiment.

FIG. 5 is a table illustrating an example overall affinity score (or percentage) calculation for the different clusters of FIG. 4, under an example embodiment. Table 500 of FIG. 5 lists the relevant metrics in column 502 for each of the existing clusters 506 (e.g., Cluster A, Cluster B, and Cluster C). The metrics for the asset being placed are provided in column 504. An overall affinity percentage for the asset relative to the clusters is shown in row 508. The details of the affinity percentage for each of the individual metrics of the asset as compared to the clusters is shown in the remaining cells of Table 500. The appropriate weighted combination of these individual percentages is then used to calculate the respective overall affinity percentage of the asset compared to each of the clusters, as shown in row 508. As shown in Table 500, the asset clearly has a low affinity (4%) with cluster C, and therefore that policy should not be applied to the asset. The asset shows the highest affinity for cluster A (62%), however it is also close to cluster B (52%). In this case, the user may want to investigate the individual metric affinity scores to see whether or not the policy for cluster B better suits the asset than that for cluster A. Given the additional details, such as shown in FIG. 5, users are aided in choosing policy assignment. As users continue to grow their environments it is expected that patterns in asset assignment become more clearly defined and the percentage of automatic asset classifications increases, thus continuously providing greater information on which to automatically assign protection policies to new or changed assets.

FIG. 5 is intended to illustrate an example set of metrics that can be used to calculate an overall affinity score based on affinity scores for each of the metrics, and embodiments are not so limited. Any additional or other metrics may also be included.

Figure 6:
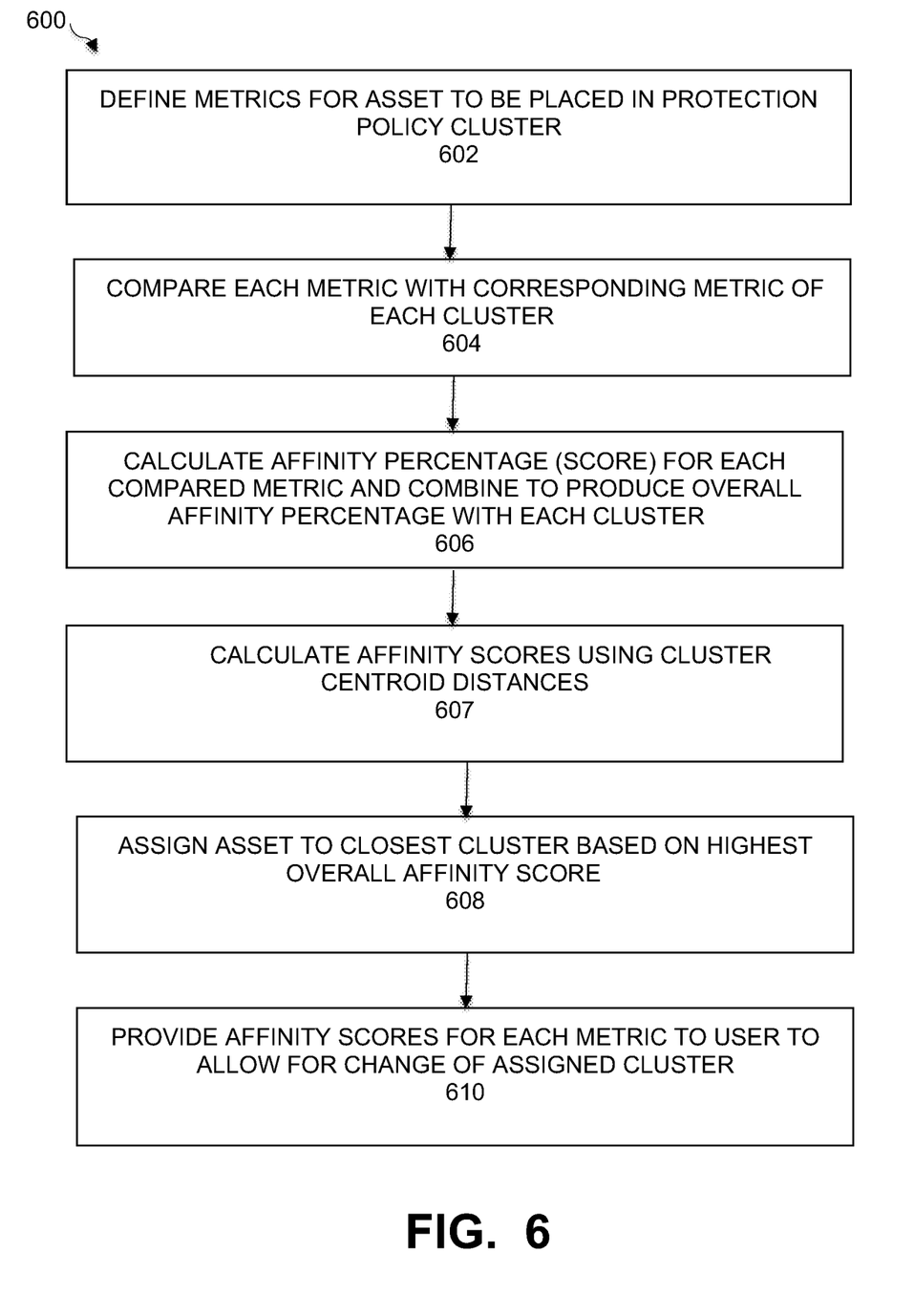
FIG. 6 is a flowchart that illustrates a sub-process of calculating an overall affinity percentage for an asset relative to other assets, under an embodiment.

FIG. 6 is a flowchart that illustrates a sub-process of calculating an overall affinity score for an asset relative to other assets, under an embodiment. As shown in FIG. 6, process 600 begins with defining the metrics for the newly discovered asset, or any asset to be assigned to a protection policy by grouping with other similar assets, 602. The process compares each metric of the asset to the corresponding metric for each other asset or group of assets in a cluster, 604. The affinity score of the asset with each other asset for each compared metric is then calculated, and from this set of affinity scores, an overall affinity score is calculated for the asset relative to the clusters, 606. This step can comprise summing the individual metric affinity scores using either a simple sum or weighted sum for each metric to determine the overall affinity score.

As mentioned above, in an embodiment, affinity scores are calculated using cluster centroid distances, 607, in which the centroid for each cluster is computed, and then the distance to this centroid for each new asset is computed.

The process then initially assigns asset to the closest cluster based on calculated overall affinity score, 608. The process then provides to the user, through an appropriate GUI, detail of the individual metric affinity score calculations, so that the user can change the cluster assignment of the asset if desired, 610. Such details can be displayed such as shown in table 500 of FIG. 5. Such a display can be provided through widgets in a product dashboard or similar UI mechanism.

Figure 7:
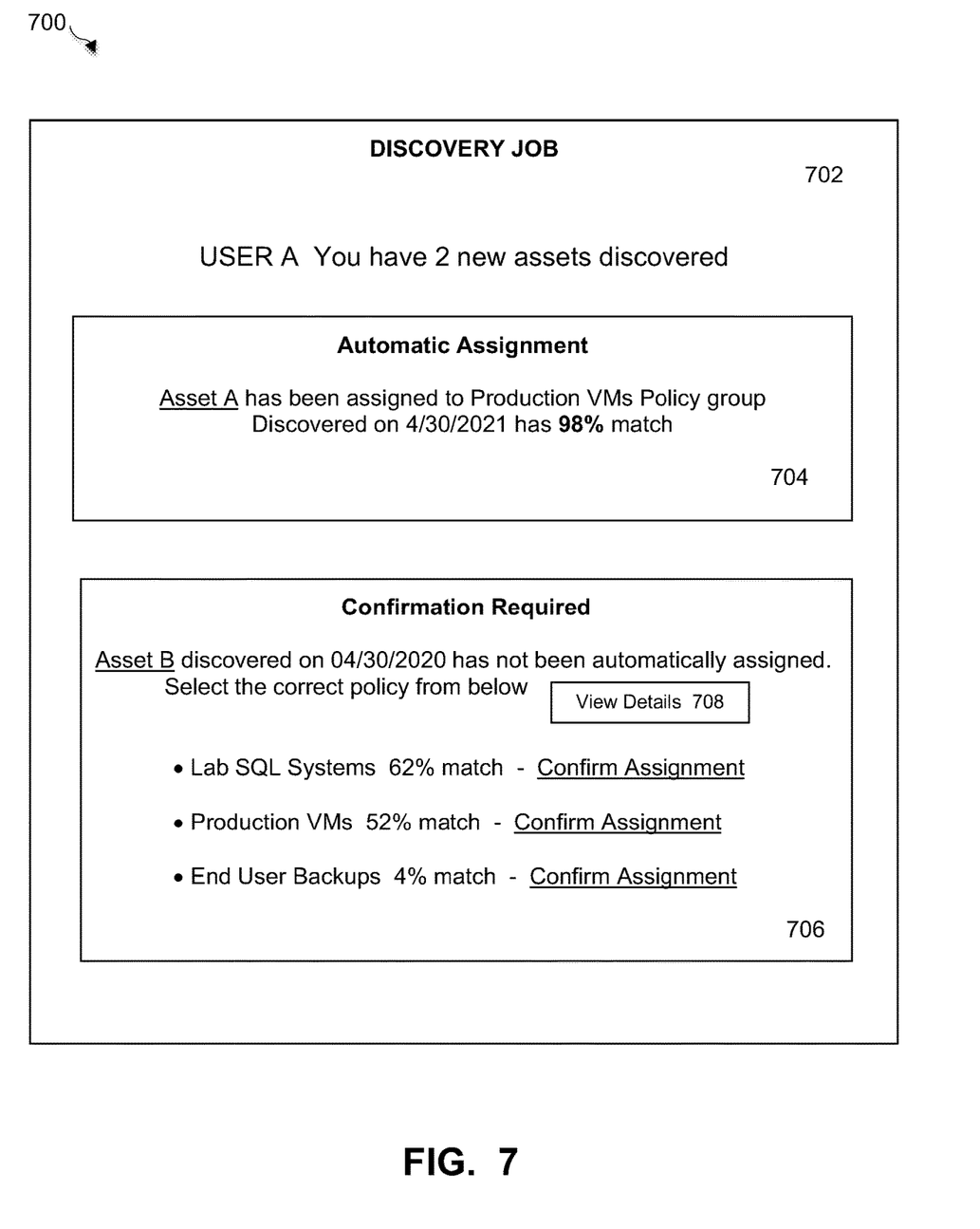
FIG. 7 is an example UI display screen that illustrates discovery of assets and request for policy assignment, under some embodiments.

With reference back to FIG. 2, the metadata-driven policy assignment process prompts the user to confirm the assignment, 210. This can be done through an alert, e-mail message, telephone call, text message, console message, and so on. In an embodiment, a user interface display area can be displayed on the user's computer or phone to allow for input of the confirmation. FIG. 7 is an example UI display screen that illustrates discovery of assets and request for policy assignment, under some embodiments. The example UI display 700 of FIG. 7 shows display upon completion of a discovery job that discovers new or changed assets and automatically places them in appropriate policy groups based on their affinity scores. The discovery job interface 702 includes two sub-windows, one for automatically assigned assets 704, and one for assets for which confirmation is required, 706.

In an embodiment, assets that have an overall affinity score in excess of a certain given percentage threshold, such as 80% or 90% may be automatically assigned to a policy group with no user confirmation required. Those assets that have less than the threshold percentage value are shown in display area 706 as requiring policy assignment confirmation. The overall affinity scores can be shown for each of the relevant policy groups, as shown in FIG. 7 (e.g., 62% match with the Lab SQL systems group, 52% match with the Production VMs group, and 4% match with the End User Backups group), and the user can then confirm assignment of the asset in the group that he or she desires. If details of individual affinity scores for the asset needs to be viewed, the "View Details" command button 708 may be used. In this case, a display screen, such as shown in FIG. 5 may be displayed to show the user the detailed breakdown of the affinity score percentages based for individual metrics for the different groups.

With reference back to FIG. 2, once the user has confirmed or directly changed the asset to protection assignment, the overall process performs the backup of the asset according to the associated policy, 212, and this assignment will remain until a new discovery job discovers the asset as moved or changed.

For process 200, the user has several input points to provide information to the system for determining the ultimate asset to policy assignment. First, the user can specify the relevant metrics for calculating the overall affinity score. Second, the user can specify the priority of these metrics with respect to weighting their relative importance in the summing or combinatorial operation that calculates the overall affinity score. Third, the user can set criteria levels for automatic assignment confirmation so that assets that have affinity scores above a particular percentage threshold (e.g., with 90% or greater similarity) are automatically assigned policy assignments, while others require confirmation.

Figure 8:
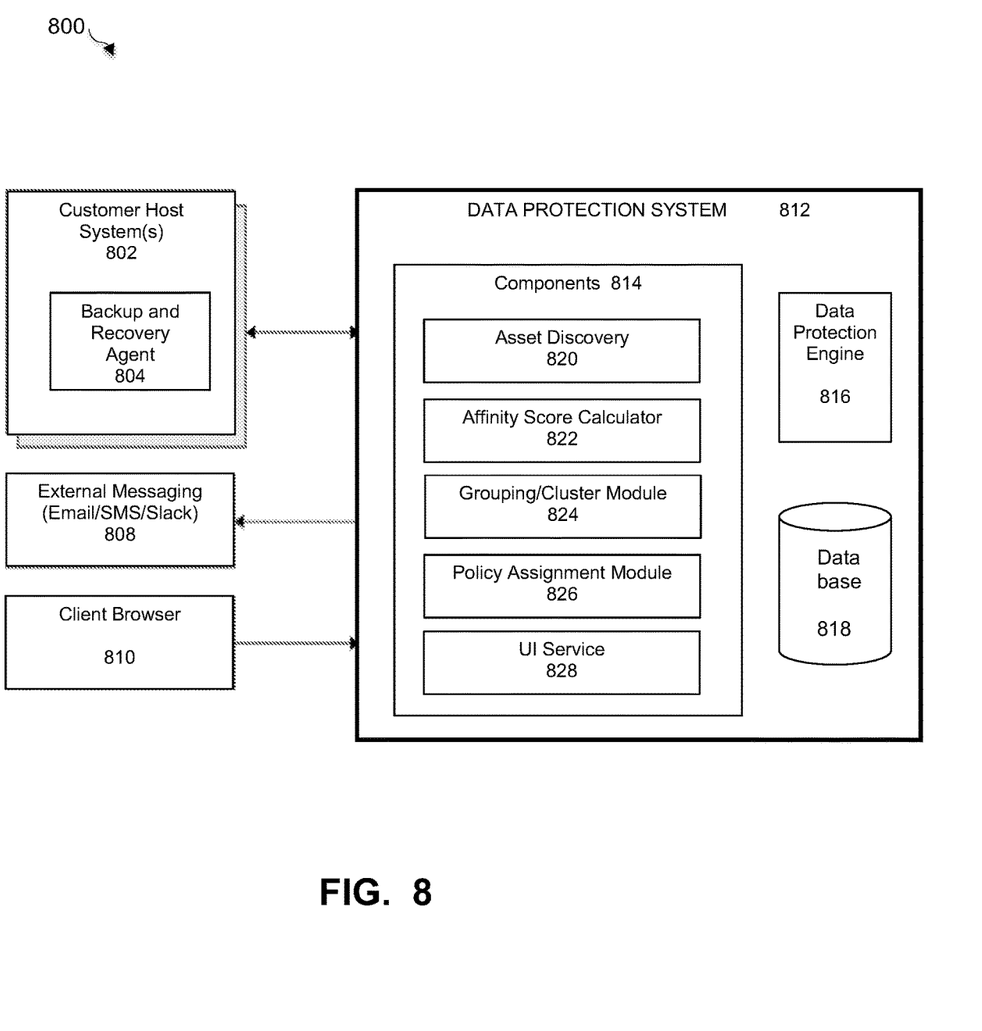
FIG. 8 is a block diagram showing components of an asset metadata processing component for protection policy assignment for use in a backup system, under some embodiments
Figure 9:
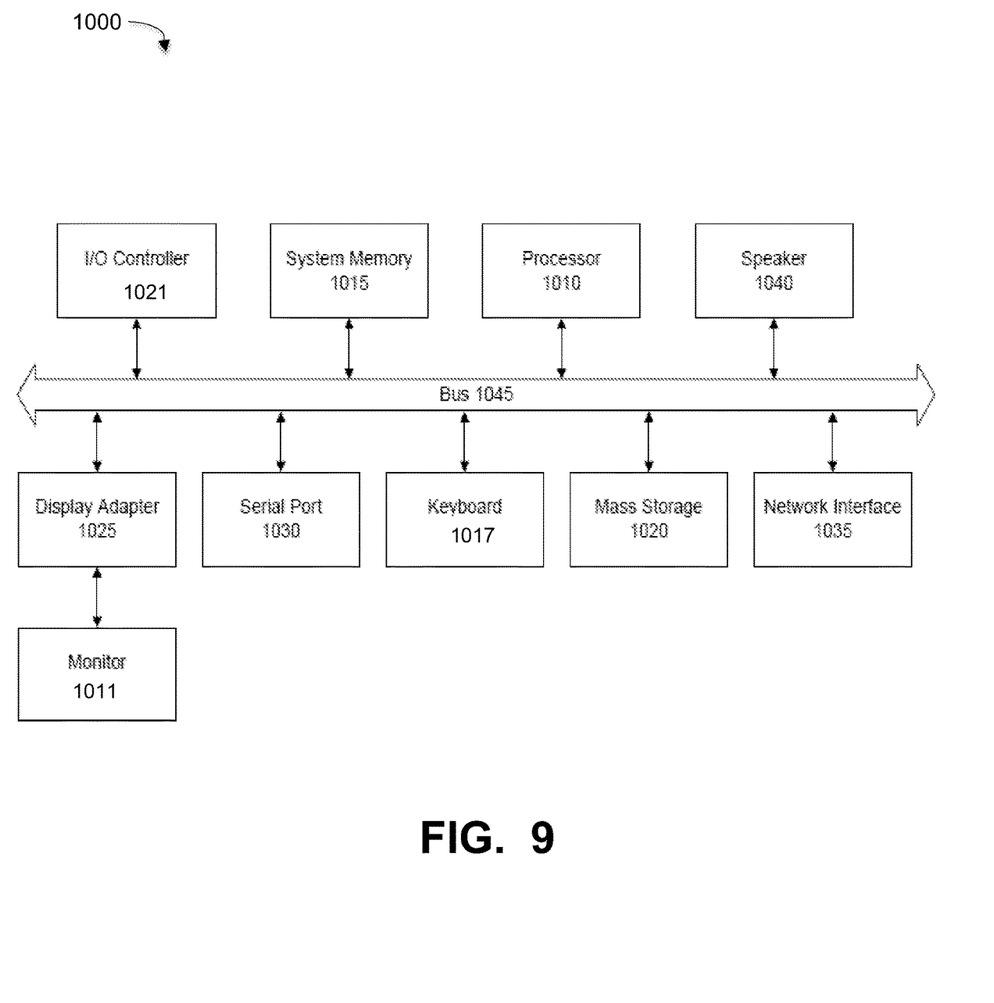
FIG. 9 is a system block diagram of a computer system used to execute one or more software components of a policy assignment process using asset metadata, under some embodiments.

In an embodiment, the asset metadata-driven policy assignment process is executed in a data backup system comprising a data protection engine for backing up data from customer host systems. FIG. 8 is a block diagram showing components of an asset metadata processing component for protection policy assignment for use in a backup system, under some embodiments. For the example embodiment shown, system 800 may constitute or comprise at least part of component 120 in FIG. 1. Corresponding to certain components that may be shown in FIG. 1, system 800 includes one or more customer host systems 802, each of which has installed a backup and recovery agent 804 for use with corresponding processes in data protection system 812. The host system 802 is coupled to data protection system 812 that includes a data protection engine 816 and a database 818 that contains certain data for the system, such as protection policies, and so on. Backup activities are scheduled and configured in the data protection system 812 and performed on the assets according to the one or more respectively assigned policies.

The components 814 of data protection system 812 include an asset discovery process 820 that discovers initial, new, or changed assets based through automatic or user-initiated operations, such as discovery jobs, and so on. As assets are discovered, they are processed by the affinity score (or percentage) calculator 822 and grouping or clustering module 824 for automatic or user-selected assignment to appropriate policy groups by the policy assignment module 826. As described above, certain notifications regarding asset assignments are sent to the user through the possible external messaging platforms 808 such as e-mail, short message service (SMS) messages, text alerts, Slack, and so on. User-provided information, such as assignment confirmations or direct policy assignments may be made through the UI service 828 interacting with client browser 810. The UI service 828 is used to host the system UI, and can be configured to handle certain specific UI and HTTP based APIs, such as: (1) dashboards, widgets, and other UI components needed to interact with the user through their client browser 810.

FIG. 8 illustrates an example system implementing an asset to policy assignment process and embodiments are not so limited. Other or additional processing components, user interface elements, and data storage/processing elements may also be used.

The asset metadata management process 120 and system 800 thus provides a dynamic and efficient method of optimally assigning policies to assets by analyzing asset metadata to identify common characteristics of assets and to use that data to assign or re-assign protection policies to new assets. It performs the main tasks of extracting asset metadata from new assets, using the extracted metadata to identify optimal policy assignments for those assets based on existing policy clusters, and prompting the user to confirm the defined policy assignments.

This metadata-driven approach of assigning assets to protection policies is significantly more powerful than the basic policy rule assignment methods of present systems, because using metadata allows a large number of variables to be considered and continuously updated as the system environment changes. In addition metadata policy associations are generally more accurate than those created from simplistic user defined policy rules, while providing the benefit of being done automatically with little or no user engagement.

System Implementation

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

The network of FIG. 1 may comprise any number of individual client-server networks coupled over the Internet or similar large-scale network or portion thereof. Each node in the network(s) comprises a computing device capable of executing software code to perform the processing steps described herein. FIG. 8 shows a system block diagram of a computer system used to execute one or more software components of the present system described herein. The computer system 1000 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is just one example of a computer system suitable for use with the present system. Other configurations of subsystems suitable for use with the described embodiments will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the described embodiments. Additionally, steps may be subdivided or combined. As disclosed herein, software written in accordance certain embodiments may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of grouping assets for protection policy assignment based on asset metadata in a data protection system, comprising:

defining a set of metrics characterizing each asset in the data protection system;

extracting, in a hardware-based asset metadata management component, metadata of the set of metrics from an asset to be assigned a protection policy;

comparing each metric of the asset with corresponding metadata of a plurality of clusters each containing one or more other assets, wherein a unique protection policy is assigned to each cluster of the plurality of clusters to be applied to each asset within a respective cluster;

determining, in the component, an overall affinity score of the asset relative to each cluster;

automatically grouping the asset into a cluster with the highest overall affinity score;

wherein the asset is automatically grouped if the overall affinity score exceeds a defined percentage threshold;

wherein if the overall affinity score does not exceed the defined percentage threshold, prompting a user to confirm the automatic grouping or to select a different cluster for grouping the asset;

wherein the overall affinity score is calculated as a combination of individual affinity scores for each metric of the set of metrics;

providing to the user the individual affinity scores to facilitate selection of the different cluster for grouping the asset; and displaying to the user, through a graphical user interface (GUI), information regarding the affinity score to allow the user to confirm or change a cluster assignment of an asset.

2. The method of claim 1 wherein the asset comprises a new asset discovered through a discovery job applied to the data protection system, and each cluster represents an existing cluster with at least one other asset.

3. The method of claim 1 wherein the affinity score is calculated by:
defining a boundary of each cluster using a clustering process;
determining a centroid of each cluster;
evaluating a distance to the centroid of each cluster for a corresponding dimension of the asset; and
using the distance to derive the affinity score.

4. The method of claim 3 further comprising:
determining, based on the distance, a respective distance from the asset to the centroid of each cluster to generate a plurality of respective distances;
identifying the largest distance of the plurality of respective distances;
normalizing the largest distance to a unitary value, such that distances from the asset to each other cluster is a percentage of the largest distance.

5. The method of claim 1 wherein the metrics comprise characteristics or attributes that define certain features of each asset relevant to a data backup or restore operation conducted by the data protection system, and wherein each metric is specified by a corresponding metadata element in the asset.

6. A computer-implemented method of assigning data assets to corresponding protection policies, comprising:
extracting metadata for a plurality of metrics for each asset;
comparing, in a hardware-based asset metadata management component, the metadata for each asset to corresponding metadata for each other asset;
calculating an affinity percentage for each metric of the asset with the metrics of each other asset;
determining an overall affinity percentage for the asset based on the calculated affinity percentage for each metric;
automatically grouping, in the component, the asset with clusters of other assets when the overall affinity percentage exceeds a defined threshold value,
wherein the asset is automatically grouped if the overall affinity score exceeds a defined percentage threshold;
wherein if the overall affinity score does not exceed the defined percentage threshold, prompting a user to confirm the automatic grouping or to select a different cluster for grouping the asset;
wherein the overall affinity score is calculated as a combination of individual affinity scores for each metric of the set of metrics;
providing to the user the individual affinity scores to facilitate selection of the different cluster for grouping the asset; and
displaying the user, through a graphical user interface (GUI), information regarding the affinity score to allow the user to confirm or change a cluster assignment of an asset; and prompting the user to select a grouping of the asset with the other clusters when the overall percentage does not exceed the defined threshold value.

7. The method of claim 6 wherein the plurality of metrics each comprise an attribute that defines certain features of each asset relevant to a data storage or movement operation conducted by the data protection system, and wherein each metric is specified by a corresponding metadata element in the asset.

8. The method of claim 7 wherein the grouping determines a protection policy to be applied to the grouped assets, and wherein a different protection policy is applied to each cluster of assets.

9. The method of claim 6 wherein the overall affinity percentage is calculated by:
defining a boundary of each cluster using a clustering process;
determining a centroid of each cluster;
evaluating a distance to the centroid of each cluster for a corresponding dimension of the asset; and
using the distance to derive the affinity score.

10. The method of claim 9 further comprising:
determining, based on the distance, a respective distance from the asset to the centroid of each cluster to generate a plurality of respective distances;
identifying the largest distance of the plurality of respective distances;
normalizing the largest distance to a unitary value, such that distances from the asset to each other cluster is a percentage of the largest distance.

11. A computer-implemented method of grouping assets for protection policy assignment based on asset metadata in a data protection system, comprising:
grouping the assets into respective clusters based on a sufficiently high similarity of characteristics defined by metadata elements of the assets;
assigning, in a hardware-based asset metadata management component, a unique protection policy to each cluster of grouped assets;
discovering a new asset to be grouped into a cluster;
assigning, in the component, the new asset to a cluster having a highest affinity percentage calculation based on a similarity of the characteristics of the asset and the grouped assets,
wherein the asset is automatically grouped if the overall affinity score exceeds a defined percentage threshold,
wherein if the overall affinity score does not exceed the defined percentage threshold, prompting a user to confirm the automatic grouping or to select a different cluster for grouping the asset;
wherein the overall affinity score is calculated as a combination of individual affinity scores for each metric of the set of metrics;
providing to the user the individual affinity scores to facilitate selection of the different cluster for grouping the asset; and
notifying the user of the assignment of the new asset; and
displaying to the user, through a graphical user interface (GUI), information regarding the affinity score to allow the user to confirm or change a cluster assignment of an asset; and prompting the user to confirm the assignment of the new asset in the cluster, or change the assignment to a different cluster.

12. The method of claim 11 wherein metadata elements encapsulate a plurality of metrics each comprising an attribute that defines certain features of each asset relevant to a data storage or movement operation conducted by the data protection system.

13. The method of claim 12 further comprising discovering the new asset through a discovery job applied to the data protection system, and each cluster represents an existing cluster with at least one other asset.

14. The method of claim 13 further comprising extracting the metadata elements from the new asset upon completion of the discovery job.

\* \* \* \* \*